R. R. BROWN.
VALVE CAP.
APPLICATION FILED OCT. 14, 1916.

1,254,975.

Patented Jan. 29, 1918.

Inventor
Ray R. Brown

Witness
H. Windridge
Frank Hough

By Victor J. Evans
Attorney

UNITED STATES PATENT OFFICE.

RAY R. BROWN, OF HAMBURG, IOWA.

VALVE-CAP.

1,254,975.

Specification of Letters Patent.   Patented Jan. 29, 1918.

Application filed October 14, 1916.   Serial No. 125,629.

*To all whom it may concern:*

Be it known that I, RAY R. BROWN, a citizen of the United States, residing at Hamburg, in the county of Fremont and State of Iowa, have invented new and useful Improvements in Valve-Caps, of which the following is a specification.

This invention relates to improvements in valve caps for use in connection with valves upon pneumatic tires.

The primary object of the invention is to provide a valve cap which may be secured to the valve casing of a pneumatic tire without the use of threads, or the like, and when applied thereto will serve to prevent foreign matter from gaining access to the valve arranged within the valve casing, or the escape of air from the tire through the valve casing when the valve therein is improperly seated.

Another object of the invention is to provide a valve cap in which a lining of elastic material is arranged within the cap casing and has formed therein a longitudinally extending channel of less diameter than the valve casing with which the cap is to be connected so that when the valve casing is passed into said channel, and the threads on the valve casing become embedded in said lining thus frictionally connecting the valve cap with the valve casing so that the cap while held against casual displacement from the valve casing may be easily and quickly removed or applied thereto as the occasion may require.

A further object of the invention is to provide a valve cap of the class described in which a lining is retained within a casing, by a cap adjustably connected with said casing and having contact with an annular flange at one end of said lining arranged between a shoulder on said casing and cap so that upon adjustment of the cap upon said casing, the flange upon the lining will be compressed and the entrance to the channel within the lining constricted thereby enabling the lining to obtain a firm grip upon a valve casing passed within said channel when the valve cap has been in use for a considerable length of time.

With these and other objects in view, the invention resides in the novel combination and arrangement of parts, which will be hereinafter described and particularly pointed out in the claim.

The preferred embodiment of the invention has been illustrated in the accompanying drawing, although no restriction is necessarily made to the precise details of construction therein shown, as changes, alterations, and modifications, within the scope of the claim may be resorted to when desired.

Like characters of reference denote corresponding parts throughout the several views in the drawing, in which.

Figure 1:
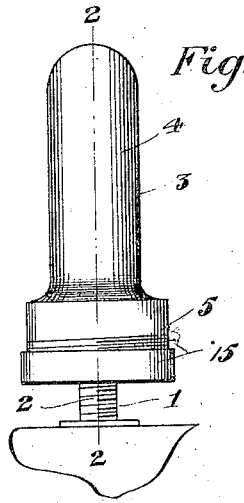
Figure 1 is a view in elevation of the improved valve cap and showing the same applied to the valve of a pneumatic tire.
Figure 2:
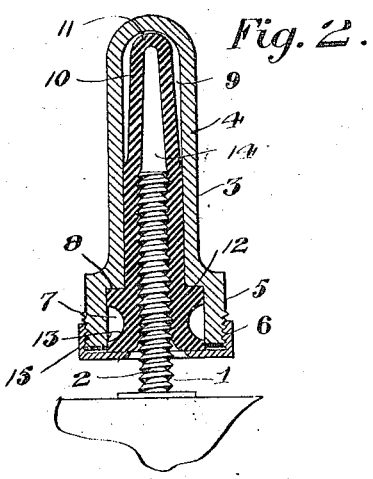
Fig. 2 is a vertical transverse section on the line 2—2 of Fig. 1.

Referring now to the drawing in detail, the numeral 1 designates a valve of the type commonly used in connection with pneumatic tires and having an exteriorly threaded valve casing 2 upon which is arranged the improved valve cap 3 as shown in Figs. 1 and 2 in the drawing.

The improved valve cap 3 comprises a hollow cylindrical outer casing 4, which is provided with a circumferentially extending flange 5 adjacent its open end with the flange threaded for a portion of its length as indicated by the numeral 6. Flange 5 provides the casing interiorly thereof with a chamber 7 and an annular shoulder 8 adjacent the intersection of said chamber with the bore 9 in said casing.

A frusto-conical shaped lining 10 formed from resilient material is arranged in the bore 9 of the outer casing 4 and is provided with a closed end 11 and has formed upon its other end a laterally extending and annular flange 12 of greater length than the flange 5 on the outer casing 4 which forms the chamber 7 in which the flange 12 is arranged to contact with the shoulder 8. The flange 12 has formed in its peripheral wall, a circumferentially extending groove 13 to enable the flange 12 to be compressed to a greater degree within the chamber 7, in a manner which will hereinafter appear, than would be possible if the flange 12 was not grooved.

The lining 10 has formed therein a longitudinally extending channel 14 opening out through the flanged end of said lining and gradually decreasing in diameter toward the closed end thereof, said channel being slightly less in diameter at its open end than the diameter of the valve casing to which the valve 3 is to be applied.

Figure 3:
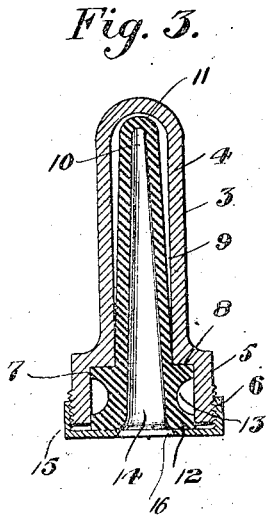
Fig. 3 is a view similar to Fig. 2 with the valve cap removed from the valve casing.
Figure 4:
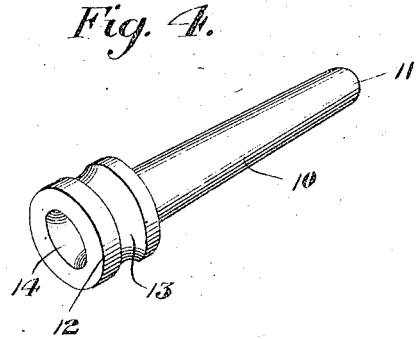
Fig. 4 is a detailed perspective view of the expandible lining and showing the same removed from the casing associated therewith.

With reference to Fig. 3 in the drawing, it will be seen that through the provision of the frusto-conical shaped lining 10, the lining for the greater portion of its length is normally spaced from the peripheral wall of the bore 9 so that when a valve casing as shown in the drawing is arranged within the channel 14, the lining will be expanded and caused to frictionally grip the valve casing thereby enabling the valve cap to be secured to the valve casing.

To render the valve cap more effective in preventing foreign matter from gaining access to the valve within the valve casing, the channel 14 within the lining 10 is tapered so that as the valve casing is forced within the lining toward the closed end thereof the lining which has been expanded within the bore 9 by the insertion of the valve casing will become compressed between the valve casing and the inner peripheral wall of the casing 4 so that the threads upon the valve casing will become embedded in the lining 10, thus enabling the lining to obtain a firmer grip upon the valve casing and also prevent the escape of air from within the tire when the valve in the valve casing is improperly seated.

A cap 15 for closing the open end of the casing 4 is threadedly connected with the flange 5 thereof, said cap contacting with the flange 12 on the lining 10 and is provided with a centrally arranged opening 16 registering with the open end of the channel 14 in said lining. The cap 15 normally serves to retain the lining 10 within the outer casing 4 and also through its adjustable connection with the flanged end of the casing enables the flange 12 to be compressed between the cap and shoulder 8 so that the entrance to the bore 14 may be constricted thereby enabling the valve cap to be used in connection with valve casings which vary in diameter and also for a considerable length of time after the channel 14 has become enlarged through long and continuous use of the valve cap.

When it is desired to apply the valve cap to the valve on a pneumatic tire, the cap is held above the valve and forced downwardly thereon, so that the valve will enter the channel 14 and expand the lining 10 to such an extent that the threads on the valve will be embedded in the lining. If the valve in the valve casing to which the cap is applied does not seat properly within the casing, the cap 15 may be adjusted upon the flange on the casing 4 to compress the flange 12 on the lining 10 between the shoulder 8 and the cap 15 and thereby not only more firmly secures the cap to the valve, but positively prevents the escape of air between the valve and the cap thereon.

From the foregoing description, taken in connection with the accompanying drawing, it is at once apparent that a valve cap has been provided which is so constructed that it may be easily and quickly applied to or disconnected from a valve and will be retained thereon without the use of threads, or the like.

Having thus described the invention, what is claimed as new, is:

In a device of the class described, a casing having an enlarged portion adjacent one end thereof, a tapered elastic lining within said casing extending beyond said enlarged portion, a circumferentially extending flange on said lining adjacent its larger end snugly fitting within said enlarged portion, said flange having a circumferentially extending groove therein, and a cap engaging said end of said lining adjustably connected with the enlarged portion of said casing.

In testimony whereof I affix my signature.

RAY R. BROWN.